US005178787A

United States Patent [19]

Hung et al.

[11] Patent Number: 5,178,787

[45] Date of Patent: Jan. 12, 1993

[54] LAVATORY CLEANING BLOCK COMPRISING N,N-DICHLORO DIALKYL HYDANTOIN AND ALUMINUM HYDROXIDE

[75] Inventors: John H. C. Hung, Holmdel; Robert Carmello, Dumont, both of N.J.

[73] Assignee: Block Drug Company, Inc., Jersey City, N.J.

[21] Appl. No.: 667,631

[22] Filed: Mar. 11, 1991

[51] Int. Cl.[5] ........................ C11D 17/00; C09K 3/00

[52] U.S. Cl. ........................................ 252/90; 252/95; 252/174; 252/102; 252/186.1; 252/186.2; 252/186.25; 252/186.34; 252/187.33; 210/753; 210/754; 210/755

[58] Field of Search .............. 252/90, 95, 174, 174.25, 252/102, 187.33, 186.1, 186.2, 186.25, 186.34; 210/753, 754, 755

[56] References Cited

U.S. PATENT DOCUMENTS

| | | | |
|---|---|---|---|
| 3,412,021 | 11/1968 | Paterson | 210/667 |
| 3,856,932 | 12/1974 | May | 252/90 |
| 4,242,216 | 12/1980 | Daugherty et al. | 252/95 |
| 4,460,490 | 7/1984 | Barford et al. | 252/174 |
| 4,537,697 | 8/1985 | Girard | 252/90 |
| 4,560,766 | 12/1985 | Girard | 252/102 |
| 4,654,424 | 3/1987 | Girard et al. | 548/311 |
| 4,713,079 | 12/1987 | Chun et al. | 252/174 |

*Primary Examiner*—Paul Lieberman
*Assistant Examiner*—Bradley A. Swope
*Attorney, Agent, or Firm*—Ostrolenk, Faber, Gerb & Soffen

[57] ABSTRACT

A toilet cleaning block which releases a halogen disinfecting agent in a controlled, substantially constant rate for 2 to about 4 months of constant contact with water and is then completely dissolved in the water comprises an admixture of an agent which releases a halogen disinfecting agent when in contact with water, about 4 to 10% aluminum hydroxide based on the total weight of the block and up to about 1% by weight of a mold rele ıse lubricant, said admixture being in the form of a coherent solid resistant to internal water penetration having a density of 1.10 to 1.60 g/cc, a ratio of effective surface area to weight of about 1:1.05 to 1:1.25 and a crush fracturing strength of about 9–109 kg.

14 Claims, 1 Drawing Sheet

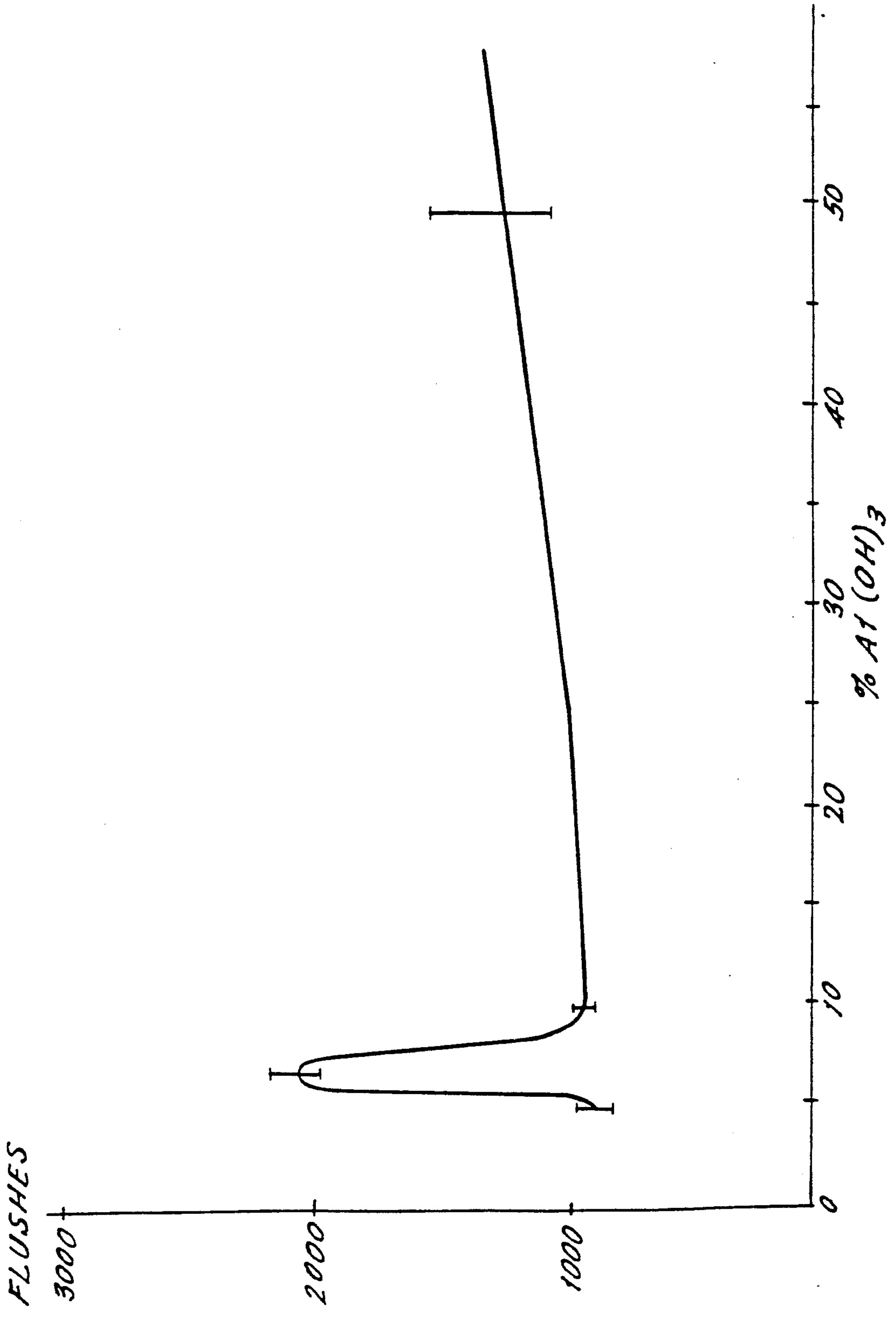
FLUSHES
3000
2000
1000
0
10
20
30
40
50
% Al(OH)3

LAVATORY CLEANING BLOCK COMPRISING N,N-DICHLORO DIALKYL HYDANTOIN AND ALUMINUM HYDROXIDE

BACKGROUND OF THE INVENTION

In-tank articles which dispense a disinfecting agent are well known. These articles employ a chemical or combination of chemicals which release a halogen containing disinfecting agent when in contact with water. A build-up of the concentration of the halogen disinfecting agent to saturation by that agent can occur within a few days and this can cause harmful affects to the tank itself and any of the associated flushing elements contained within that tank. In order to control the halogen release rate, which also controls the harmful effects of the halogen in the tank and can prolong the useful life of the product, the chemical system employed is usually contained within some type of a dispensing system such as a container or a metering device. The dispensing system is an inconvenient and messy component of the product which must be removed from the tank and disposed of when the chemicals are exhausted.

Use of a product which can be simply dropped into the tank will eliminate the dispenser but such a product reintroduces all of the problems which the dispenser was designed to circumvent. For instance, the dispenser limited the quantity of water which contacted the chemicals or limited the surface area of the chemicals in contact with the water or limited the release of the halogen containing water into the body of the tank or provided more than one of these functions. Without the container or dispenser, all of the water within the tank can come into contact with the entire surface area of the chemicals.

The formulation of a drop-in product which releases the halogen disinfecting agent over a period of several hours is feasible. However difficulty in formulation increases rapidly as the amount of time over which the product is desired to be active increases. If it is desired to have a controlled, substantially constant rate of halogen disinfectant agent release in a range for instance of 0.5 to 5 ppm, the difficulty increases exponentially as the useful life increases beyond a time of about 1 week Nevertheless, consumers do not wish to constantly replenish a drop-in lavatory cleaning block and desire a product which needs to be replaced after at least 2 months, and preferably about every 3 to 4 months of use. The fact that toilet systems are essentially static as opposed to dynamic systems where the water is constantly flowing adds additional difficulties.

It is the object of this invention to provide a toilet cleaning block which releases a halogen disinfecting agent in a controlled, substantially constant rate for 2 to 4 months of constant contact with water and at the end of this time has been completely dissolved by the water. This and other objects of the invention will become apparent to those skilled in this art from the following detailed description.

BRIEF DESCRIPTION OF THE DRAWING

The sole figure is a graph of toilet cleaning block longevity.

SUMMARY OF THE INVENTION

This invention relates to a toilet cleaning block which releases a halogen disinfecting agent in a controlled, substantially constant rate for about 2 to 4 months of continuous contact with water and its use. More particularly, the block comprises an admixture of an agent which releases a halogen disinfecting agent when in contact with water, a given quantity of aluminum hydroxide and optionally a mold release lubricant, the admixture being in the form of a coherent solid resistant to internal water penetration, the solid having a density of 1.10 to 1.60 g/cc, a ratio of effective surface area to weight of 1:1.05 to 1:1.25, and a crush fracturing strength of about 9–109 kg.

DETAILED DESCRIPTION OF THE INVENTION

The toilet cleaning block of the present invention is a coherent solid comprising an admixture of an agent which releases a halogen disinfecting agent when in contact with water and aluminum hydroxide. The block may also contain minor amounts of other materials. For instance, the block can contain up to about 1% by weight of an internal mold release lubricant. An external lubricant may be used in the manufacturing process to help release the block from the mold. Another example of a possible optional component is an odorant.

The major part of the toilet cleaning block of the present invention is constituted by the agent which releases a halogen disinfecting agent when in contact with water. Any such agents known heretofore can be used and it is preferred that such agents are N-halogenated organic compounds. Thus for instance such compounds can be chlorinated and/or brominated phthalimides, p-toluene sulphonamides, azodicarbonamidines, hydantoins, glycolurils, cyanurates, amines, melamines and the like. Among the compounds which can be used are N-chloro-phthalamide, N-bromo-phthalamide, N-dichloro-p-toluene sulphonamide, 2,5-N,N'-dichloro-azodicarbonamidine hydrochloride, N,N'-dichloro-dimethyl-hydantoin, N-bromo-N'-chlorodimethyl-hydantoin, N,N'-dibromo-dimethyl-hydantoin, N-bromo-N-chloro-diphenyl-hydantoin, N,N,N,N-tetrachlorodimethyl-glycoluricil, N-bromo-N,N-dichloro-dimethylglycoluricil, N,N'-dibromo-dimethyl-glycoluricil, N,N,N,N-tetrachloro-glycoluricil, N,N-dichlorodichloroyl, N-bromo-N-chloro-sodium cyanurate, dibromo triethylene diamine dihydrochloride, bromo-chlorotriethylene diamine dihydrochloride and N,N,N-trichloro-melamine. In the present invention, dialkyl substituted hydantoins and especially chlorinated 5,5-di-$C_{1-4}$ alkyl substituted hydantoins, are preferred.

It is known that solid halo-5,5-dialkyl substituted hydantoins dissolve slowly in water. It is also known that the rate of solubility can be increased substantially by the use of a relatively small amount of a solubilizing agent such as magnesium oxide, barium hydroxide, sodium bicarbonate, sodium carbonate, etc. and that aluminum hydroxide will decrease the rate of solubilization. See, e.g. Girard U.S. Pat. No. 4,537,697. Surprisingly, it was discovered that if the quantity of the aluminum hydroxide was maintained within a certain range, namely between about 5 and 10% based on the weight of the toilet cleaning block, preferably about 6–8% and especially about 6.5 to 7.5% by weight, and if the block was prepared such that it had a density falling within a particular range, namely 1.1 to 1.60 g/cc and also if the ratio of effective surface area to weight fell within a certain range, namely about 1:1.05 to 1:1.25, the toilet cleaning block would release a controlled, substantially constant rate of halogen disinfecting agent within the range of 0.5 to 5 ppm over a period of 2 to about 4 months of constant contact with water. The block will deliver a constant, uniform efficacious level of halogen (0.5-3 ppm) for about 1700 to 2100 flushes and will be completely dissolved at the end of its useful life, leaving no residue in the tank.

The toilet cleaning block of the present invention has a density of 1.10 to 1.60 g/cc and preferably about 1.30 to 1.50 g/cc. The ratio of effective surface area (in square centimeters) to weight (in grams) is about 1:1.05 to 1:1.25 and preferably about 1:1.10 to 1:1.20. By effective surface area is meant the surface area of the block which is exposed to water in the toilet. In practice, one face or a part of one face of the toilet block will always be resting on an interior surface of the toilet. The effective surface area of the block will therefore be roughly the total surface area of the block less the surface area of one of the largest faces of the block.

The toilet cleaning block of the present invention is prepared by dry mixing the hydantoin and the aluminum hydroxide, preferably in finely divided form, and the internal mold lubricant if such a lubricant is being employed, in the absence of added water. Any type of mixer such as a twin-shell, ribbon blender or similar type of mixer that is designed to provide a homogeneous admixture can be used. The particle size of the hydantoin is preferably in the range of 20 to 200 mesh and that of the aluminum hydroxide is preferably in the range of 100 to 325 mesh. The admixture is then transferred to the mold of a press whose surfaces can be coated with an external mold lubricant if the same is being employed. An amount of pressure designed to provide the desired density and effective surface area/weight ratio is then applied so that the mixture is formed into a coherent solid which is resistant to internal water penetration and has a crush fracturing strength of about 20 to 240 pounds (about 9-109 kg), preferably about 40 to 120 pounds (about 18-54 kg). Such strength is measured by positioning the block perpendicular to the lower base in a Rimac Spring Tester Model #67 (Rinck-McIlwaine Inc., Dumont, N.J.), applying compression and reading the value at fracture from the recoil protected, zero adjust arm on the dial. In order to obtain the desired properties, the pressure will vary depending on the particular chemicals employed and the particle sizes of the particulates within the admixture but is generally within the range of about 50 to 890 kg/cm$^2$.

The following non-limitive examples illustrate the invention.

EXAMPLE 1

A commercially available briquette containing 86 weight % 1,3-dichloro-5,5-dimethyl hydantoin and 3 weight % 1,3-dichloro-5-ethyl-5-methyl hydantoin was ground to a powder of <50 mesh. The hydantoin mixture was dry blended with 7 weight %, based on total weight, of aluminum hydroxide powder having a particle size of 325 mesh. One hundred grams of the mixture was placed in a press die having a diameter of about 7.0 cm and a pressure of about 8000 kg exerted on the powder. The resulting tablet had a density of 1.35 g/cc and a ratio of effective surface area to weight of 1:1.12.

EXAMPLE 2

To examine the effect of the tabletting pressure on the physical properties of the tablet, Example 1 was repeated using a die having a diameter of 7.0 cm seven times. The tabletting pressure employed and the resulting physical parameters of the tablet are set forth in the following table.

| Pressure (kg) | Height of Tablet (cm) | Density g/cc | Effective Surface Area (cm$^2$) |
|---|---|---|---|
| 900 | 2.7 | 0.9 | 99.0 |
| 1360 | 2.6 | 1.0 | 95.0 |
| 1820 | 2.4 | 1.1 | 93.0 |
| 2800 | 2.3 | 1.1 | 90.0 |
| 4600 | 2.2 | 1.2 | 87.3 |
| 7200 | 2.1 | 1.3 | 84.3 |
| 9000 | 2.0 | 1.3 | 83.7 |

EXAMPLE 3

In order to evaluate the useful life of the tablets, a number of tablets were placed in separate toilet tanks which were then flushed 15 times per day. The chlorine content immediately after a flush was measured each day. The end point was defined as the 14th day on which the tablet released less than 1 ppm chlorine. The data was taken from, or extrapolated from, 100 gram tablets having a density of 1.35 and a ratio of effective surface area to weight of about 1:1.19. The tablet testing was performed in duplicate and the average of each pair of tablets reported. The results are graphed in the sole figure.

As can be seen from that figure, the longevity increases dramatically starting at 5% aluminum hydroxide, and especially above 6% aluminum hydroxide and then drops off dramatically at about 10% aluminum hydroxide.

EXAMPLE 4

The flushing test of Example 3 was repeated using tablets continuing various percentages of aluminum hydroxide made by the Example 1 procedure. The results were:

| % of $Al(OH)_3$ in Formulation | Average Duration (Flushes) | Weight (g) | Duration (Flushes) | Average Delivery (ppm) |
|---|---|---|---|---|
| 5.0 | 905 | 93.6 | 820 | 1-3 |
| | | 100 | 990 | 1-3.5 |
| 7.0 | 2057 | 100 | 1950 | 1-2 |
| | | 100 | 2165 | 1-2.5 |
| 10.0 | 928 | 100 | 925 | 0.5-1.0 |
| | | 100 | 930 | 0.5-1.5 |
| 25.0 | 990 | 75 | 990 | 0.5-0.75 |
| 50.0 | 1240 | 95 | 1010 | 1-2.5 |
| | | 100 | 1470 | 1-3 |

Various changes and modifications can be made to the product and process of this invention without departing from the spirit and scope thereof. Various embodiments which were set forth herein were for the purpose of further illustrating the invention but were not intended to limit it.

What is claimed is:

1. A toilet cleaning block which releases a halogen disinfecting agent in a controlled, substantially constant rate for 2 to about 4 months of constant contact with water and which has completely dissolved at the end of said time which comprises an admixture of an N,N-dichloro dialkyl hydantoin which releases a halogen disinfecting agent when in contact with water, between 6 and 8 weight % based on the weight of the block of aluminum hydroxide, and up to about 1 % by weight of a mold release lubricant, said admixture being in the form of a coherent solid resistant to internal water penetration having a density of 1.10 to 1.60 g/cc, a ratio of effective surface area to weight of about 1:1.05 to 1:1.25 $cm^2/g$ and a crush fracturing strength of about 9 to 109 kg.

2. The toilet cleaning block of claim 1 wherein the halogenated hydantoin is a chlorinated 5,5-dialkyl hydantoin.

3. The toilet cleaning block of claim 1 comprising a compressed tablet of particulate disinfecting agent and particulate aluminum hydroxide.

4. The toilet cleaning block of claim 3 having a density of about 1.30 to 1.50 g/cc and a ratio of effective surface area to weight of about 1:1.10 to 1:1.20 $cm^2/g$.

5. The toilet cleaning block of claim 4 in which the amount of aluminum hydroxide is about 6.5 to 7.5%.

6. The toilet cleaning block of claim 5 in which the particulate disinfecting agent has a mesh size of about 20 to 200 and the particulate aluminum hydroxide has a mesh size of about 100 to 325.

7. The toilet cleaning block of claim 6 having a crush fracturing strength of about 18 to 54 kg.

8. The toilet cleaning block of claim 7 in which the agent is a mixture of 1,3-dichloro-5,5-dimethyl hydantoin and 1,3-dichloro-5-ethyl-5-methylhydantoin and the aluminum hydroxide is about 7 weight %.

9. The toilet cleaning block of claim 1 consisting essentially of a compressed tablet of particulate disinfecting agent and particulate aluminum hydroxide.

10. The toilet cleaning block of claim 9 in which the amount of aluminum hydroxide is about 6.5 to 7.5%.

11. The toilet cleaning block of claim 10 in which the particulate disinfecting agent has a mesh size of about 10 to 200 and the particulate aluminum hydroxide has a mesh size of about 100 to 325.

12. The toilet cleaning block of claim 11 having a crush fracturing strength of about 19 to 54 kg.

13. The toilet cleaning block of claim 12 in which the agent is a mixture of 1,3-dichloro-5,5-dimethyl hydantoin and 1,3-dichloro-5-ethyl-5-methyl-hydantoin and the aluminum hydroxide is about 7 weight %.

14. A toilet cleaning block which releases a chlorine disinfecting agent in a controlled, substantially constant rate for 2 to about 4 months of constant contact with water and which has completely dissolved at the end of said time which consists essentially of an admixture of an N,N-dichloro dialkyl hydantoin which releases a chlorine disinfecting agent when in contact with water, between 6 and 8 weight % based on the weight of the block of aluminum hydroxide, and up to about 1 % by weight of a mold release lubricant, said admixture being in the form of a coherent solid resistant to internal water penetration having a density of 1.30 to 1.50 g/cc, a ratio of effective surface area to weight of about 1:1.10 to 1:1.20 $cm^2/g$ and a crush fracturing strength of about 9 to 109 kg.

* * * * *